March 25, 1930.  G. H. SCHANZ  1,751,844
EXTRUDING MACHINE
Filed July 11, 1927
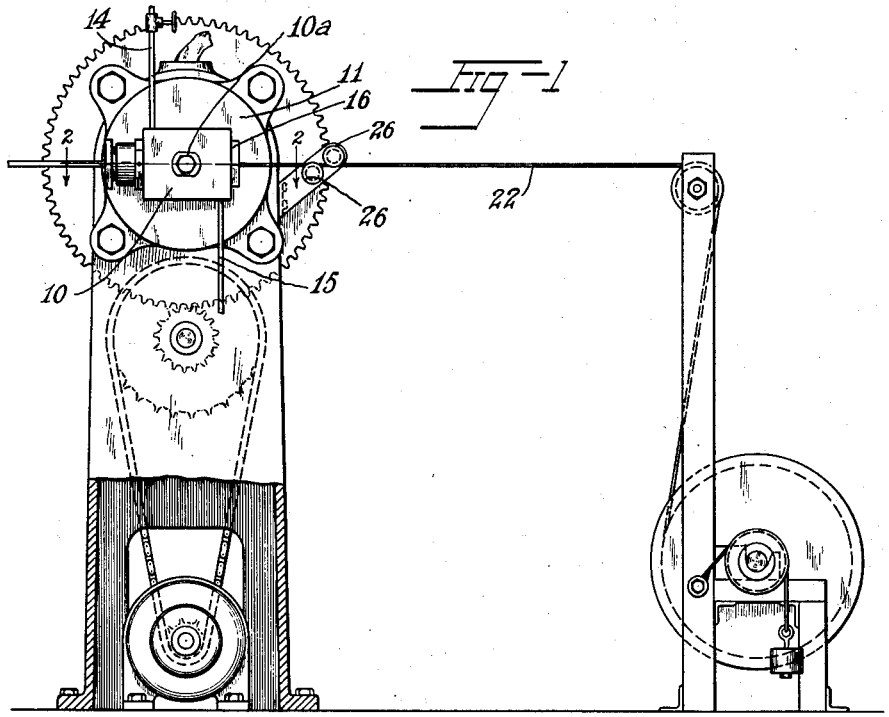
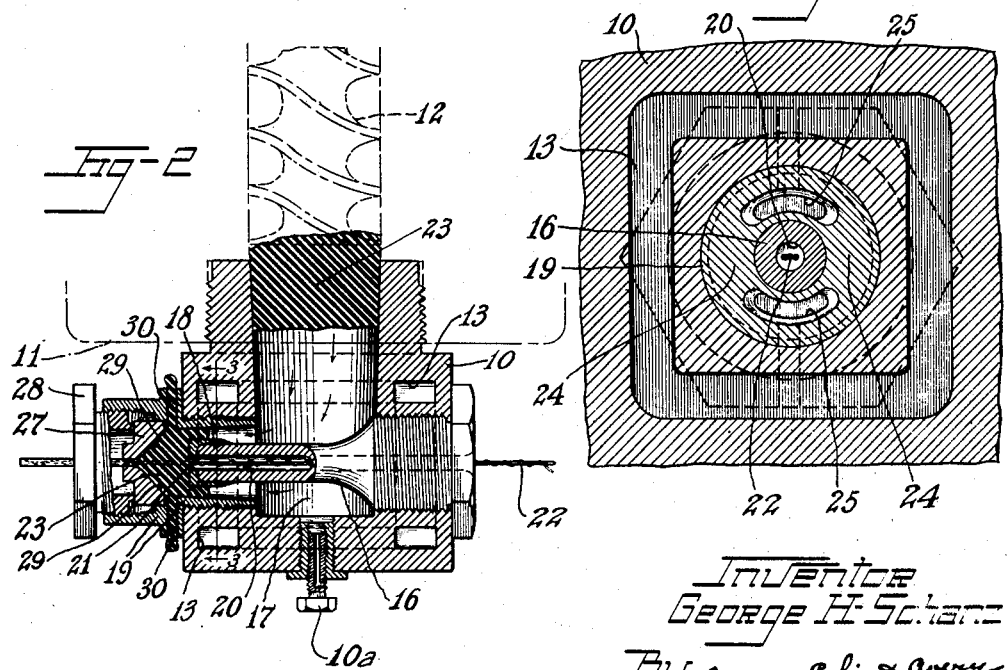
Inventor
George H. Schanz
By Pierson, Eskin & Avery
Attys.

Patented Mar. 25, 1930

1,751,844

UNITED STATES PATENT OFFICE

GEORGE H. SCHANZ, OF AKRON, OHIO, ASSIGNOR TO THE B. F. GOODRICH COMPANY, OF NEW YORK, N. Y., A CORPORATION OF NEW YORK

EXTRUDING MACHINE

Application filed July 11, 1927. Serial No. 204,714.

This invention relates to extruding machines and especially extruding machines adapted to apply a coating of rubber or the like to a flat strip of material such as an assembly of wires adapted to be wound into a tire-bead reinforcement.

In extruding machines heretofore employed for this purpose the coating of rubber upon the assembly of wires frequently has been non-uniform, because of the imperfect centering of the wires in the extrusion die, and the wires frequently have broken and jammed in the machine.

The chief objects of my invention are to avoid these disadvantages.

I have determined that the chief causes of such imperfections in the operation of the machines heretofore used are imperfect support of the guide through which the wires are drawn to the die, undesirable form of the passage through which the rubber passes to the die, lack of symmetry and balance in the stock's lines of flow onto the wires, and inequality of pressures in the stock on the two sides of the assembly of wires, and I have corrected these defects by providing certain features of construction which are shown in their preferred forms in the accompanying drawings, of which:

Fig. 1 is an elevation of a side-delivery extruding machine embodying my invention in its preferred form and means for supplying the assembly of wires thereto.

Fig. 2 is a horizontal section of parts of the extruding machine, on line 2—2 of Fig. 1.

Fig. 3 is a section on line 3—3 of Fig. 2.

Referring to the drawings, the machine comprises a side-delivery head 10 screwed into the end-member 11 of an extruding machine having the usual screw 12, the head being formed with a steam chamber 13 and provided with pipes 14, 15 for circulating steam therein and with the usual apertured overflow plug 10ª.

A wire-guider 16 is mounted in the wall of the head on the wire-receiving side of the head and extending across the stock-chamber 17 of the head and into a socket 18 formed as the hub of a two-armed spider or perforate wall portion of a guider-support and die-holder 19 which is screwed into the wall of the head 10 at the delivery side thereof. The wire-guider and the socketed hub portion 18 of the member 19 are formed with respective wire-guiding apertures 20, 21 for an assembly of wires such as the woven wire tape 22 which is to be coated with rubber stock 23, and the said socketed hub portion 18 is integrally connected with the outer portion of the member 19 by two oppositely positioned spider arms 24, 24 defining a pair of diametrically opposite channels 25, 25, which are so positioned as to admit rubber from the stock-chamber 17 of the head primarily onto the respective flat faces of the wire assembly, the latter being maintained in the proper plane, in passing through the head, by means of flanged guide rollers 26, 26 between which the assembly is drawn to the head and by the means (not shown) for pulling the assembly through the head.

Set in a socket formed in the outer end of the guider-support and die-holder 19 is the die 27 for shaping the coating upon the wire assembly, the die being retained in its socket by an apertured plug 28 screwed into the member 19.

The inner face of the die 27 is formed with four bevels such as the bevels 29, 29 for wiping the stock onto the respective flat faces and edge faces of the wire assembly and for avoiding jamming of the latter in the die.

The guider-support and die-holder 19 is formed with overflow apertures 30, 30 disposed medially and normally with relation to the respective flat faces of the wire assembly, the provision of the two overflow apertures so positioned resulting in an avoidance of excessively unequal stock pressures on the two flat faces of the wire assembly, more rapid escape of the plastic stock through one or the other of the apertures serving to prevent great preponderance of pressure on that side of the wire assembly.

The general operation of the machine will be obvious from the foregoing description.

The member 19 firmly braces the delivery end of the wire-guides 16 so that the latter is maintained in accurate alignment with the die and at the same time the aperture-defining spider arms 24 of the member 19 compel the stock to flow symmetrically onto the wire assembly so that distortion or displacement of the latter by the flow of the stock is avoided, the provision of the two symmetrically positioned vent apertures lessens the inequality of pressures in the respective streams of stock received from the apertures 25, and the inner face of the die by reason of its symmetrically beveled form resists torsional flow of the stock passing to the die aperture and at the same time avoids jamming of the wire and provides a wiping of the stock onto the wire, the latter being pulled through the machine at such speed as to exert a forward drag on the stock in the tapered portion of the die, which results in a greater pressure of the stock against the wire in the region of the wiping action than that imposed, in the vicinity of the overflow apertures, by the screw 12.

The rapid pulling of the wire assembly through the machine results in a forward wiping of the stock by the wire at the delivery side of the socket 18 such that, with the overflow apertures preventing excessive pressures, the stock is prevented from flowing into the socket member 18 and guider 16.

Modifications are possible within the scope of my invention as defined in the appended claims.

I claim:

1. An extruding machine comprising an extruding die, means for drawing a strand of material therethrough, means for forcing a plastic therethrough to coat the strand, said die being formed with bevels on its receiving side symmetrically disposed with relation to the axis of the die and leading to its die aperture, stock confining means on the receiving side of the die and formed with symmetrically disposed overflow apertures, a channeled guide for the strand, the said guide having its delivery treminus within the stock confining means and closely adjacent the said overflow apertures, and means there directly bracing the guide to the stock-confining means, the bracing means defining stock passages symmetrically formed and disposed with relation to the axis of the guide.

2. An extruding means as defined in claim 1 including means for passing a flat strip of material through the guide and the die with its flat faces disposed in determinate planes, the bevels of the die, the overflow apertures and the stock passages defined by the bracing means being substantially symmetrical with relation to a plane parallel and normal to the strip.

3. An extruding machine comprising an extruding die, means for drawing a flat strip of material therethrough with its flat faces disposed in determinate planes, means for forcing a plastic therethrough to coat the strip, and stock-confining means interposed between the stock-forcing means and the die and formed on opposite sides of the strip's path of movement with symmetrically disposed passages for the stock, the said passages having their longitudinal middle plane substantially in coincidence with a plane medial, parallel and normal to the strip and the stock-confining means being formed with a plurality of overflow apertures symmetrically disposed with relation to the axis of the die.

4. An extruding machine comprising a die shaped to form a flat ribbon of plastic stock, means for forcing a plastic therethrough, means for guiding a flat strip of material to the die for its incorporation in the flat ribbon of plastic stock and stock-confining means defining a stock passage from the forcing means to the die, the said stock-confining means being formed with a plurality of overflow passages symmetrically positioned with relation to and positioned on opposite sides of the plane of the strip.

5. A side-delivery tube machine head having a stock chamber and a stock passage leading laterally therefrom, a strip-guider mounted in the wall of the head diametrically opposite the said passage and extending across the said chamber and into the said passage, a spider structure in said passage for bracing the guider, and stock-confining means for holding plastic stock forced through said spider in pressure contact with a strip of material drawn through said strip-guider, the said stock-confining means being formed with a plurality of overflow passages aligned, longitudinally of the flow of stock, with stock-passages of the said spider.

In witness whereof I have hereunto set my hand this 2nd day of July, 1927.

GEORGE H. SCHANZ.